UNITED STATES PATENT OFFICE.

HARRY SCHAGRIN, OF SOUTH BETHLEHEM, PENNSYLVANIA.

PROCESS OF MAKING SILICO-SPIEGEL.

1,190,678. Specification of Letters Patent. Patented July 11, 1916.

No Drawing. Application filed August 3, 1914. Serial No. 854,818.

*To all whom it may concern:*

Be it known that I, HARRY SCHAGRIN, a citizen of the United States, residing at South Bethlehem, in the county of Northampton and State of Pennsylvania, have invented certain new and useful Improvements in Processes of Making Silico-Spiegel; and I do hereby declare the following to be a full, clear, and exact description of the invention, such as will enable others skilled in the art to which it appertains to make and use the same.

This invention relates to a process for producing silico-spiegel from waste clinker, or cinder, from zinc furnaces, and has for its object to produce a method of obtaining this product in an efficient and expeditious manner.

To these ends the invention consists in the novel steps and combinations of steps constituting my process, all as will be more fully hereinafter disclosed and particularly pointed out in the claim.

In order that my process may be clearly understood it is said: The waste clinker or cinder, from some zinc smelters especially those employing franklinite, or willemite ores, contains as much as 15% to 22% of manganese oxid, MnO, which is mixed with say 28% to 56% iron oxid, FeO, about 20% to 30% silicon oxid, $SiO_2$, about 8% carbon, C, about 6% alumina, $Al_2O_3$, about 10% calcium oxid, CaO, about 2% magnesium oxid, MgO, and about 4% to 5% zinc oxid, ZnO. I take this clinker, crush the same to a suitable size for furnacing, and mix carbon with it up to about 25% of its weight. I prefer to use waste coal dust for this purpose and it may be combined or held in the charge in any suitable manner. When the charge is suitably prepared I preferably place it in a furnace of the blast type, having a stack to accommodate the charge, and preferably having a downcomer, or pipe, leading from the top of the stack to any suitable collector for the evolved gases and vapors. Said furnace is also provided with a suitable hearth, or receptacle for the molten metal, and with suitable means for tapping the same out of the furnace. I next raise the charge by any suitable means to a temperature sufficient to fuse the same, which will be about 1800° C. or possibly 2000° C. I prefer to employ one or more electric arcs for this purpose, permitting the molten iron, and silicon to settle down on to the hearth, while drawing off the slag from above said hearth. The zinc contained in the charge will be volatilized and pass off with the gases and other vapors through the downcomer into the collector when it may be separated out, by any suitable means, preferably by means of bags or by a gravity process.

I prefer not to admit any oxygen or air into the furnace, and to maintain a reducing atmosphere therein at all times, so that the manganese oxid is rapidly reduced and the metallic manganese volatilized in the fusion zone. This manganese vapor however, I have discovered is not carried off to any substantial extent by the evolved carbon monoxid, CO, and other gases, although some metallic manganese and also some manganese oxid does escape with the zinc and may be suitably recovered, if desired. The larger proportion of the reduced manganese I have further discovered is caught in the fusion zone by the molten iron and silicon, when it alloys with the same, and is borne down into the molten bath on the hearth of the furnace, from which it may be tapped off as a silico-spiegel having a silicon content of from 10% to 15%, a manganese content of from 10% to 20% or higher; an aluminum content of about 1.5% and an iron content of from say 60% to 70%. There is also some carbon, usually found in the spiegel.

In addition to the manganese that is caught in the fusion zone by the molten metals there present, a considerable quantity passes above said zone in a state of vapor and is condensed on the down coming charge material, whereupon it is revolatilized when it reaches the fusion zone and is largely caught by the fused metals in the manner above disclosed. The result of this action of repeatedly causing the volatilized manganese to return to the fusion zone is to cause a very large proportion of the same to become alloyed with the iron and silicon to form the silico-spiegel as above disclosed.

It often happens that a silico-spiegel richer in manganese than that just disclosed is desired, and in such cases I prefer to mix with the cinder or clinker, above employed, a greater or less proportion of an ore carrying a larger content of manganese. For example, Brazilian manganese ore, may be employed, which often contains 50% of manganese. When employing such ore mixed with the above clinker, I may run up the manganese content to as high as 40% manganese in my silico-spiegel.

The aluminum content of about 1.5% aluminum found in the silico-spiegel thus produced has valuable de-oxidizing properties, and thus differs from any other silico-spiegel with which I am acquainted, but this content is too small to cause it to serve as a substitute for the well known alloy consisting of aluminum 3% to 5%, manganese about 14% silicon about 8%, carbon about 2%, and iron about 65% to 75%, extensively used in the purification of high grade steel. Accordingly, in order to form a substitute for said alloy from my silico-spiegel I may add to the above charge sufficient ferro-aluminum, or I may add sufficient aluminum after the spiegel is tapped from the furnace, to bring the total content up to 3% to 5% aluminum. Of course, in each case sufficient steel or iron is also added to bring the iron content to that required. Iron ore, or iron oxid, is not suitable for this last addition, because a pure quality of iron is required.

It is obvious that those skilled in the art may vary the details of my process without departing from the spirit of my invention and therefore I do not wish to be limited to the above disclosure except as may be required by the claim.

What I claim is:

The process of producing a silico-spiegel containing aluminum and recovering zinc which consists in providing suitable charge material from waste clinker containing the oxids of zinc, aluminum, iron, manganese and silicon; mixing carbon with said charge material; heating said material in a reducing atmosphere, to a temperature sufficient to alloy said manganese with the aluminum, iron, and silicon present, and to volatilize said zinc; and drawing off said zinc vapors and suitably recovering the same, substantially as described.

In testimony whereof I affix my signature in presence of two witnesses.

HARRY SCHAGRIN.

Witnesses:
T. W. WITHERSPOON,
Jos. H. BLACKWOOD.